(12) United States Patent
Avery

(10) Patent No.: US 7,658,032 B2
(45) Date of Patent: Feb. 9, 2010

(54) FIBER ATTRACTOR AND ATTACHMENT APPARATUS FOR INCREASING THE ATTRACTING TENDENCIES OF FISHING LURES

(76) Inventor: Ronald Allen Avery, 104 Cherry St., Munising, MI (US) 49862

( * ) Notice: Subject to any disclaimer, the term of this patent is extended or adjusted under 35 U.S.C. 154(b) by 113 days.

(21) Appl. No.: 11/765,817

(22) Filed: Jun. 20, 2007

(65) Prior Publication Data
US 2007/0289197 A1 Dec. 20, 2007

Related U.S. Application Data

(60) Provisional application No. 60/815,306, filed on Jun. 20, 2006.

(51) Int. Cl.
*A01K 85/00* (2006.01)
*A01K 85/14* (2006.01)
(52) U.S. Cl. ............... 43/42.28; 43/42.25; 43/42.5; 43/42.11; 43/42.13; 43/42.53
(58) Field of Classification Search ............... 43/42.19, 43/42.11, 42.13, 42.25, 42.5, 42.28, 42.53
See application file for complete search history.

(56) References Cited

U.S. PATENT DOCUMENTS

| | | | | |
|---|---|---|---|---|
| 104,930 A * | 7/1870 | Chapman | ............ | 43/42.28 |
| 1,418,229 A * | 5/1922 | Buddle | ............ | 43/42.28 |
| 1,522,450 A * | 1/1925 | Hayes | ............ | 43/42.28 |
| 1,615,963 A * | 2/1927 | Stanley | ............ | 43/42.28 |
| 1,738,617 A * | 12/1929 | Scharrer | ............ | 43/42.28 |
| 1,903,558 A * | 4/1933 | Taylor | ............ | 43/42.5 |
| 1,925,197 A * | 9/1933 | Maynard | ............ | 43/42.28 |
| 2,000,734 A * | 5/1935 | Accetta | ............ | 43/42.28 |
| 2,051,978 A * | 8/1936 | Accetta | ............ | 43/42.28 |
| 2,066,254 A * | 12/1936 | Delk | ............ | 43/42.28 |
| 2,069,724 A * | 2/1937 | Pflueger | ............ | 43/42.13 |
| 2,124,822 A * | 7/1938 | Johnson | ............ | 43/42.28 |
| 2,145,283 A * | 1/1939 | Accetta | ............ | 43/42.28 |
| 2,148,784 A * | 2/1939 | Stewart et al. | ............ | 43/42.28 |
| 2,164,415 A * | 7/1939 | Mallett | ............ | 43/42.28 |
| 2,167,163 A * | 7/1939 | Toepper | ............ | 43/42.28 |
| 2,228,591 A * | 1/1941 | Brown | ............ | 43/42.28 |
| 2,374,279 A * | 4/1945 | Fugler | ............ | 43/42.28 |
| 2,427,267 A * | 9/1947 | Fiskaali | ............ | 43/42.25 |
| 2,492,064 A * | 12/1949 | Rauh | ............ | 43/42.28 |
| 2,589,117 A * | 3/1952 | Oberbeck et al. | ............ | 43/42.28 |
| 2,591,391 A * | 4/1952 | Walsh | ............ | 43/42.25 |
| 2,594,038 A * | 4/1952 | Lauterwasser | ............ | 43/42.28 |
| 2,639,537 A * | 5/1953 | Wagner | ............ | 43/42.28 |
| 2,741,057 A * | 4/1956 | Morris et al. | ............ | 43/42.13 |
| 2,754,613 A * | 7/1956 | Rogers et al. | ............ | 43/42.28 |
| 2,780,884 A * | 2/1957 | Hadfield | ............ | 43/42.19 |

(Continued)

FOREIGN PATENT DOCUMENTS

DE    10015572 A1 * 10/2001

*Primary Examiner*—Darren W Ark
(74) *Attorney, Agent, or Firm*—Brooks Kushman P.C.

(57) ABSTRACT

A fishing lure combination having a spoon 6 with a leading region 17, a disturbance-creating attachment lug 16 extending from a surface 19 associated with the leading region 17, and trailing fronds 14 that are secured via a shaft 12 to the attachment lug 16. The trailing fronds 14 are agitated by turbulent fluid flow downstream of the attachment lug 16.

5 Claims, 3 Drawing Sheets

U.S. PATENT DOCUMENTS

| | | | | | |
|---|---|---|---|---|---|
| 2,783,577 | A | * | 3/1957 | Jennings | 43/42.28 |
| 2,851,815 | A | * | 9/1958 | Warner | 43/42.28 |
| 2,931,123 | A | * | 4/1960 | Jensen, Jr. | 43/42.28 |
| 2,940,204 | A | * | 6/1960 | Mehnert | 43/42.28 |
| 2,952,092 | A | * | 9/1960 | Swenson | 43/42.28 |
| 2,992,507 | A | * | 7/1961 | Gray | 43/42.25 |
| 3,087,274 | A | * | 4/1963 | Franklin | 43/42.28 |
| 3,138,892 | A | * | 6/1964 | Hall | 43/42.25 |
| 3,313,059 | A | * | 4/1967 | Jures | 43/42.5 |
| 3,359,674 | A | * | 12/1967 | Strumor | 43/42.28 |
| 3,393,465 | A | * | 7/1968 | Powell | 43/42.28 |
| 3,405,475 | A | * | 10/1968 | Ross | 43/42.28 |
| 3,750,322 | A | * | 8/1973 | Putnam | 43/42.25 |
| D228,551 | S | * | 10/1973 | Harris | 43/42.28 |
| 3,803,747 | A | * | 4/1974 | Cartwright | 43/42.28 |
| 3,848,354 | A | * | 11/1974 | Austad et al. | 43/42.25 |
| 3,947,989 | A | * | 4/1976 | Bart | 43/42.28 |
| 3,990,171 | A | * | 11/1976 | Davis | 43/42.28 |
| 3,996,688 | A | * | 12/1976 | Hardwicke, III | 43/42.28 |
| 4,149,334 | A | * | 4/1979 | Rogers | 43/42.25 |
| 4,149,335 | A | * | 4/1979 | Duescher | 43/42.25 |
| 4,380,884 | A | * | 4/1983 | Pond | 43/42.25 |
| 4,435,914 | A | * | 3/1984 | Norman | 43/42.28 |
| 4,453,333 | A | * | 6/1984 | Olson | 43/42.5 |
| 4,542,607 | A | * | 9/1985 | Cartwright | 43/42.28 |
| D287,991 | S | | 1/1987 | Lummis | |
| 4,712,325 | A | | 12/1987 | Smith | |
| 4,713,906 | A | | 12/1987 | Distaffen | |
| 4,735,012 | A | * | 4/1988 | Smith et al. | 43/42.51 |
| 4,777,759 | A | * | 10/1988 | Wulff | 43/42.25 |
| 5,027,543 | A | * | 7/1991 | Peterson | 43/42.25 |
| 5,062,236 | A | * | 11/1991 | Fish | 43/42.5 |
| 5,065,541 | A | * | 11/1991 | Coody | 43/42.25 |
| D328,633 | S | | 8/1992 | Terrill | |
| 5,303,497 | A | * | 4/1994 | Rabideau | 43/42.28 |
| 5,394,636 | A | * | 3/1995 | Rabideau | 43/42.13 |
| 5,428,917 | A | * | 7/1995 | Cunningham | 43/42.19 |
| 5,491,926 | A | * | 2/1996 | Mostovsky | 43/42.19 |
| 5,511,338 | A | * | 4/1996 | Costanzo | 43/42.5 |
| 5,630,289 | A | * | 5/1997 | Dotson | 43/42.28 |
| D399,293 | S | | 10/1998 | Cordingly | |
| 5,857,283 | A | * | 1/1999 | Perrick | 43/42.5 |
| 5,918,406 | A | * | 7/1999 | Wilson | 43/42.28 |
| 5,956,887 | A | * | 9/1999 | Mostovsky | 43/42.19 |
| 5,974,723 | A | * | 11/1999 | Taibi | 43/42.13 |
| 6,061,947 | A | * | 5/2000 | Mooers | 43/42.5 |
| 6,108,961 | A | * | 8/2000 | Milawski et al. | 43/42.19 |
| 6,233,863 | B1 | * | 5/2001 | Dotson | 43/42.28 |
| 6,363,651 | B1 | | 4/2002 | Garst | |
| 6,493,984 | B1 | | 12/2002 | Bechhold | |
| 6,601,336 | B1 | * | 8/2003 | Link | 43/42.13 |
| 6,637,147 | B2 | * | 10/2003 | Ooten | 43/42.19 |
| 6,655,074 | B2 | * | 12/2003 | Pentland | 43/43.13 |
| 6,675,524 | B2 | * | 1/2004 | McNally et al. | 43/42.13 |
| 6,748,692 | B2 | * | 6/2004 | Sprouse | 43/42.13 |
| 6,857,220 | B2 | | 2/2005 | King | |
| 7,197,846 | B1 | * | 4/2007 | Gibson | 43/42.5 |
| 7,493,724 | B1 | * | 2/2009 | Peterson | 43/42.5 |
| 2003/0019146 | A1 | * | 1/2003 | McNally et al. | 43/42.13 |
| 2003/0163944 | A1 | * | 9/2003 | Ooten Hanes | 43/42.19 |
| 2004/0123510 | A1 | * | 7/2004 | Essad et al. | 43/42.13 |
| 2006/0191186 | A1 | * | 8/2006 | Perrick | 43/42.25 |
| 2007/0169398 | A1 | * | 7/2007 | Taszarek | 43/42.19 |
| 2008/0172923 | A1 | * | 7/2008 | Nicholson | 43/42.19 |
| 2008/0271359 | A1 | * | 11/2008 | Moffitt | 43/42.25 |

* cited by examiner

FIBER ATTRACTOR AND ATTACHMENT APPARATUS FOR INCREASING THE ATTRACTING TENDENCIES OF FISHING LURES

CROSS-REFERENCE TO RELATED APPLICATIONS

This application is a non-provisional application based on prior provisional patent application No. 60/815,306, filed on Jun. 20, 2006. The disclosure of that application is incorporated herein by reference.

BACKGROUND OF THE INVENTION

1. Field of the Invention

This invention relates generally to fishing lures and more specifically to a fishing lure that has the characteristics of an enhanced attracting tendencies.

2. Background Art

In the context of sport fishing, a lure is an object that is attached to the end of a fishing line. The lure is designed to resemble and move like a specimen of fish prey. Conventionally, many lures are equipped with one or more hooks with which to engage to fish when the fish attacks the lure. Typically, motion is imparted to lures by winding a line back on a reel, by sweeping, jiggling movements with an apparatus such as a fishing rod or by being pulled behind a moving boat ("trolling"). When used on a fishing rod and fishing reel, the lure is used by casting it. Then, it is continually cast out and sometimes retrieved. The act of retrieval makes the lure describe a movement that resembles "swimming".

A spoon lure is an oblong, concave metal piece resembling a spoon. The spoon lure is mainly used to attract fish by reflecting light and by moving randomly. The spoon lure is conventionally an oblong, concave metal piece with a shiny chrome or paint finish, with one or more hooks on the end.

While the basic principle of design has stayed the same over the years, application and use has changed some. In its beginning, the ("traditional") spoon was used to cast and retrieve. However, since trolling motors have become popular on fishing boats, a revised version of the traditional spoon was adopted: this type of lure resembled the casting spoon, but was often made with thinner material. Using a trolling motor on a boat, a fisherman can cover a wider body of water, thereby increasing his/her chances for a successful day. Using split shots, or other forms of weights, the fisherman can manage his fishing lures' depth, depending on the boat speed involved. With the ability to cover more area, the average fishermen could take their new spoon lures to any body of water, without full knowledge of the underwater geographical layout; which is key to catching some species of fish. The traditional casting spoon (heavier version) is primarily used by fishermen that already know the water and what lies beneath. A fishermen will anchor the boat 10 to 20 feet behind the area where they believe the fish are at. Then the spoon is cast PAST this point, and retrieved through the given strike zone.

Fishermen have found (though, not proven) that by using different color variations can help catch fish. Since then, multiple color options have been added to the traditional spoon lure, and different materials have been used to affect the color applied. When the spoon is silver plated, gold plated, or dyed; it gives the spoons' finish a much more vibrant or 'brilliant' look. Source: "http://en.wikipedia.org/wiki/Spoon_lure"

Fishing lures have been described in the prior art. Among references revealed by a search conducted before filing this non-provisional application are the following: U.S. Pat. Nos. 4,453,333; 4,712,325; 4,713,906; 4,735,012; 5,062,236; 5,065,541; 5,511,338; 5,857,283; 6,061,947; 6,363,651; 6,493,984; 6,857,220; Des. 287,991; Des. 328,633; Des. 399,293; and U.S. Pat. Pub. 2006/0191186.

The fishing lures identified in the search leave several problems unsolved. For example, it would be desirable for the fish to bite the hook rather than the spoon. Additionally, it would be desirable in many circumstances to lessen the amount of drag and wobble of the spoon, which may be an important factor in attracting fish. In some circumstances, the fish may be below the spoon, since spoons are designed to pass through the water with a hook facing upwardly to avoid entanglement with weeds. But the spoon should not intercede between a fish below and an attractor/hook above the arrangement.

SUMMARY OF THE INVENTION

In broad terms, the invention in one aspect includes a fishing lure combination that has a spoon with a leading region. Extending from a concave surface associated with the leading region is a disturbance-creating attachment lug. Trailing fronds are secured to the attachment lug. The fronds are agitated by turbulent flow downstream of the attachment lug.

One object of the invention is to provide reflective patterns and color that may be an attractive to fish to be court.

Another object of the invention is to provide a lure that can move through the water in a manner to be determined by the fisherman.

To accomplish these and related objects this invention may be embodied in a form such as that illustrated in the accompanying drawings. The drawings, however, are out to be considered merely as illustrative. Changes can be made to the specific design illustrated and described within the scope of the claims that follow.

BRIEF DESCRIPTION OF THE DRAWINGS

The objects, features and advantages of the invention may become more fully appreciated when considered in conjunction with the accompanying drawings, in which similar reference characters designate the same or similar parts throughout the several figures.

FIGS. 1 and 1A are quartering perspective views of a lure assembly according to one aspect of the invention, in which FIG. 1A is an enlarged view of one sub-assembly thereof;

DETAILED DESCRIPTION OF THE PREFERRED EMBODIMENT(S)

Figure 1:
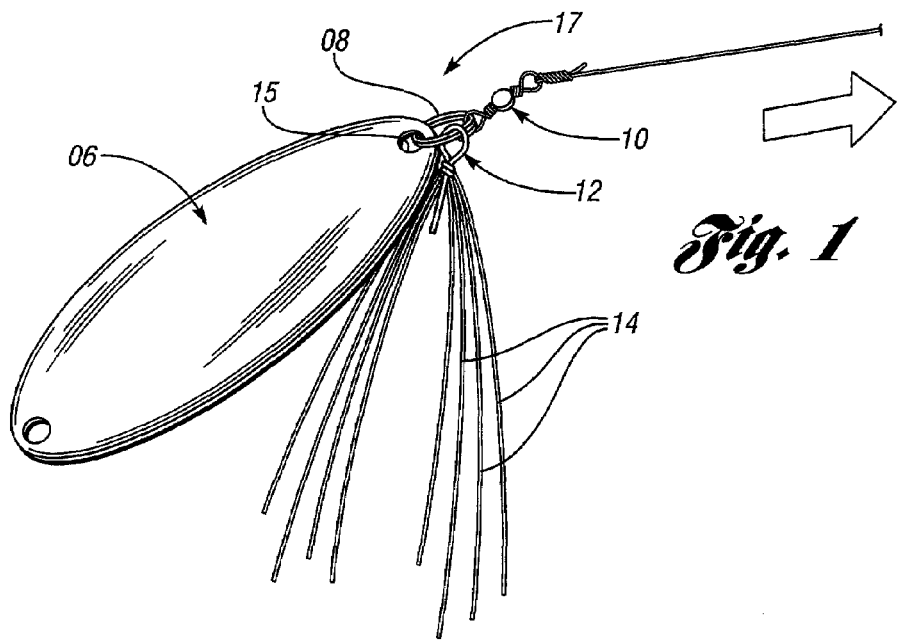

Referring to FIGS. 1 through 4 of the drawings, there are depicted several components of a fishing lure assembly. Components of the assembly include a fishing lure 6 and an attachable subassembly that includes in one embodiment (1) a metal ring 8; (2) a barrel or crane swivel 10 that connects the ring 8 to a fishing line; (3) a shaft 12; and attracting fibers or fronds 14 that are secured to the shaft 12.

Figure 1A:
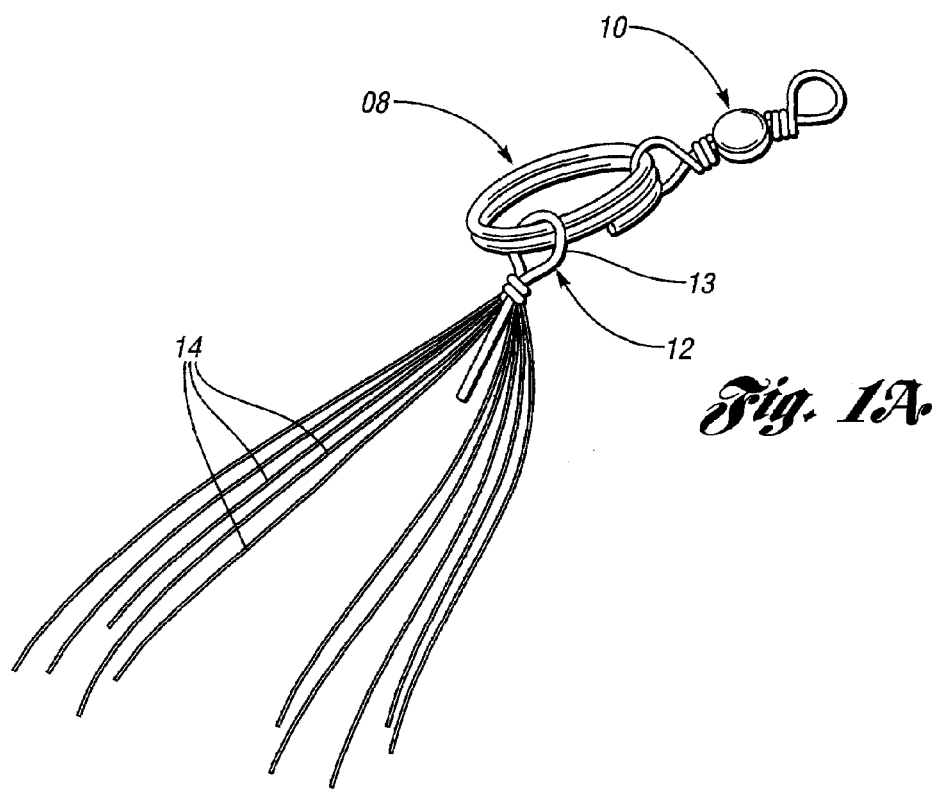

FIG. 1A depicts one embodiment of the subassembly. The shaft 12 is provided in that embodiment with an eye 13 that is engageable with the ring 8. Optionally, fibers 14 can be secured to the eye 13 or shaft 12. The swivel 10 allows for rotation of the sub-assembly about an axis imaginarily defined by a direction of forward propulsion in response to a pulling force exerted by the fishing line.

As illustrated, the metal ring 8 may be in the form of a welded or split ring. That subassembly in some embodiments is connected by the metal ring 8 to a forward hole 15 which is provided in a leading end portion 17 of the body of a spoon-type fishing lure 6.

To attach the subassembly to the lure, the welded or split ring 8 is secured through the hole 15 in the leading portion 17 of the lure 6. The ringed end or eye 13 of the shaft 12 is then secured to the ring 8.

In order to control the position of the attractor 14 on either the front 19 or the back 21 side of the lure, a barrel swivel 10 is attached to the welded or split ring 8 on one side or the other of the lure 6. The barrel swivel 10 provides for attachment to the fishing line.

Figure 2A:
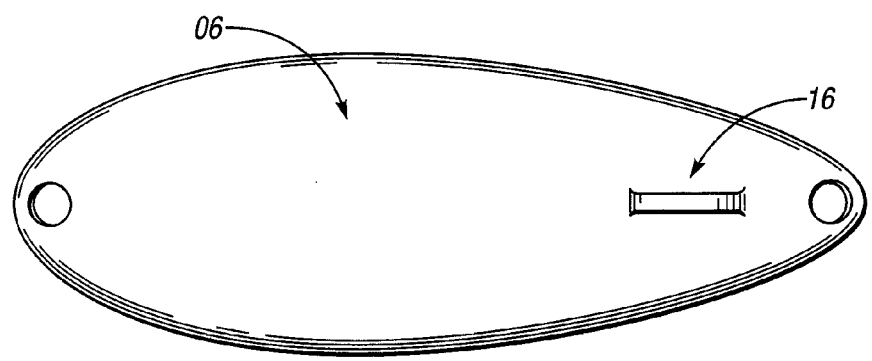
FIGS. 2A-C depict means for attachment, utilizing a cutting and bending of the receiving lure (FIG. 2A) to accommodate attachment of a sub-assembly of the apparatus.

In FIG. 2A, there is depicted a preferred embodiment with a pair of cuts or slits 16a that are formed in the lure 6 and extend parallel to a longitudinal axis of the lure 6. The cuts define a bridge or raised portion 16 that is provides if desired an attachment loop. Without wishing to be bound by any particular theory, the inventor believes that the bridge or raised portion 16, when urged forwardly through the water, may create an area of disturbance downstream from the raised portion 16. The flexible tail portion or fibers and fronds 14 lie under the influence of that area of disturbance and as a result become agitated thereby. The consequent movement of the fronds 14 tend to be attractive to fish.

Figure 2B:
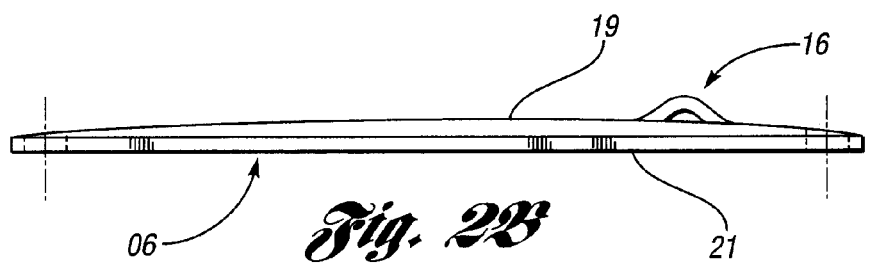
Figure 2C:
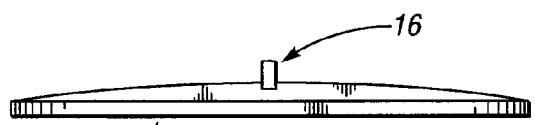

In FIG. 2B, a side view of one alternative embodiment of the lure 6 is shown. As depicted, the illustrated embodiment is of a planar lure 6 that in some embodiments has a uniform thickness. In one embodiment, the bridge 16 extends upwardly from a front side 19 of the lure. It will of course be appreciated that the lure of the present invention may or may not be planar. If the lure is a spoon-type, the front side 19 is concave and the backside 21 is convex. Generally, the concave surface of the spoon-type lure faces upwardly.

It will be appreciated that the two cuts 16a may be made to an existing lure as a modification. Alternatively, the bridge portion could be shaped between the cuts to form the raised attachment loop 16. In other words, the bridge 16 could be formed as a modification to existing lures, or be provided during the lure manufacturing process.

Figure 3:
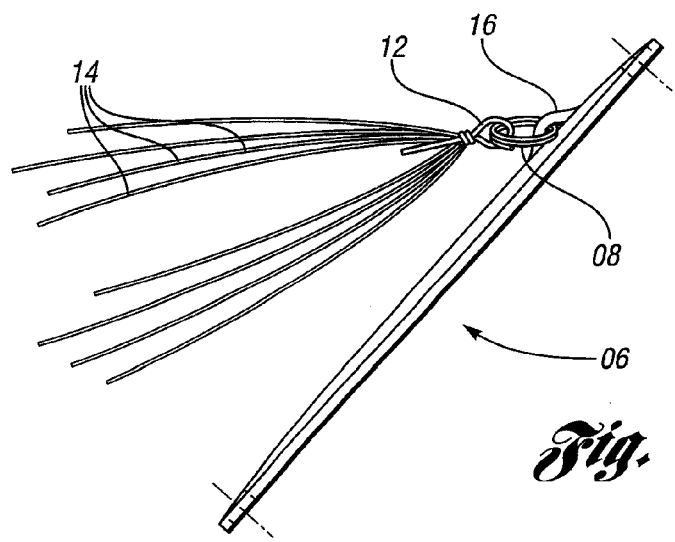
FIG. 3 is a side a view of one embodiment of the lure assembly using the attachment means depicted in FIGS. 2A-B.

Turning now to FIG. 3, there is depicted a combination of the ring 8 attached to the bridge on saddle 16. In that embodiment, there is no in-line swivel 10, unlike the embodiment depicted in FIGS. 1 and 1A.

In the alternative attachment method shown in FIG. 3, the welded or split ring 8 is attached to the bridge 16 in the lure 6. Then the attractor shaft's eye 12 is attached to the ring 8. This attachment mechanism makes use of the barrel swivel 10 optional. Alternatively, one may attach an open ringed shaft directly into the bridge of the spoon 16, thereby eliminating the split ring 8.

Figure 4A:
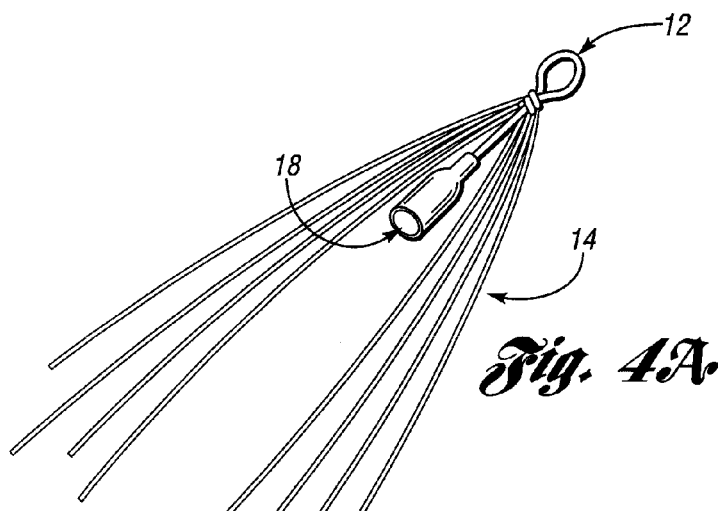
FIGS. 4A-C illustrate three embodiments of an attractor shaft which enable the attractor to be linked to alternative additional components.
Figure 4B:
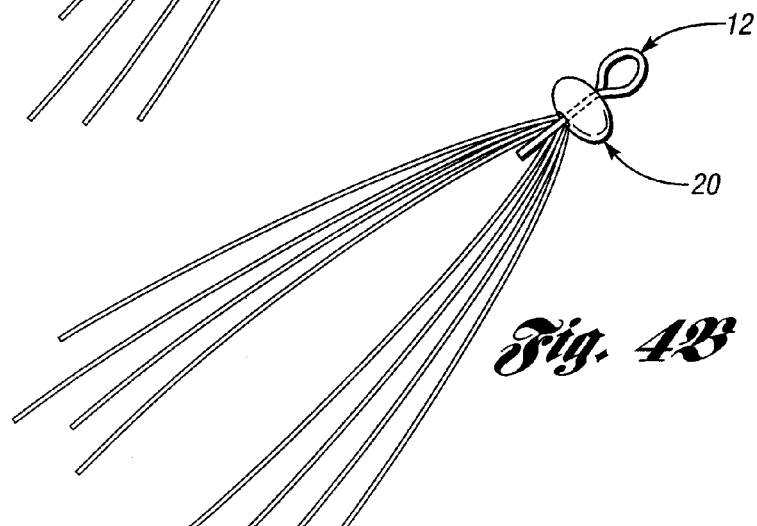
Figure 4C:
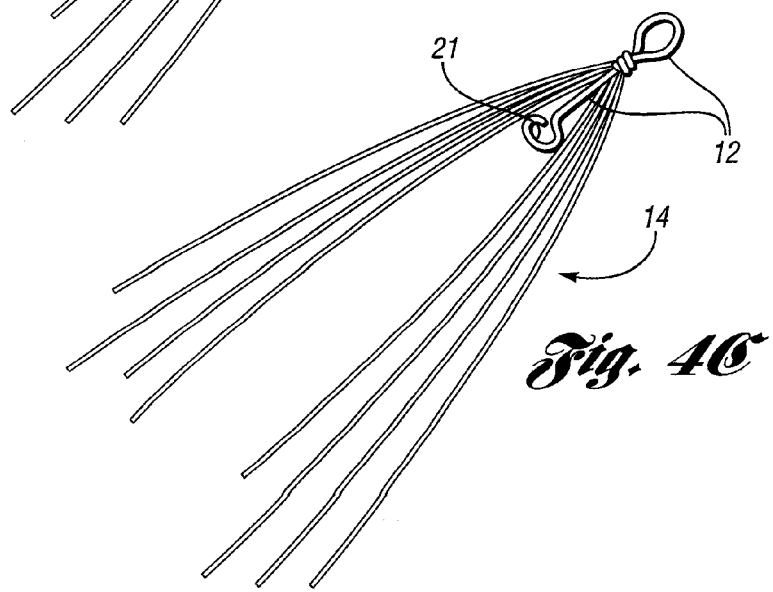

FIGS. 4A-C depict alternative embodiments that are added to the attractor shaft 12. In FIG. 4 a hollow receptor 18 is provided into which additional devices can be placed for attracting fish. Alternatively, any noise producing bead 20 (FIG. 4B) might usefully be attached to the shaft 12. Optionally, (FIG. 4C) an open loop 21 could be provided on an end of the shaft 12. This allows for additional attracting devices to be attached if desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fishing lure combination having:
   a lure with a leading region, a trailing region, a longitudinal axis defined between the regions, and an aperture defined therein for attachment to a line;
   a raised bridge portion defined by a plurality of slits formed in the lure along sides of the raised bridge portion and located downstream from the aperture, the plurality of slits having lengths which extend parallel to the longitudinal axis of the lure, the raised bridge portion extending upwardly from the leading region so that when urged forwardly through the water, the raised bridge portion creates an area of disturbance downstream, and the raised bridge portion having first and second ends and an intermediate portion therebetween, the first and second ends being on the lure leading region and the intermediate portion spaced above the lure leading region;
   a ring that is secured to the bridge portion, the ring extending through an opening defined below the intermediate portion of the raised bridge portion and above the lure leading region;
   a shaft that is secured to the ring, the shaft having an eye at one end thereof, the eye extends through the ring to secure the shaft to the ring; and
   fronds that are secured directly on the shaft, the fronds moving under an influence of the area of disturbance, thereby attracting fish.

2. The fishing lure combination of claim 1 wherein the shaft is provided with a hollow receptor located at an opposing end of the shaft that lies opposite to the end having the eye.

3. The fishing lure combination of claim 1 wherein a noise producing bead is secured to the shaft.

4. The fishing lure combination of claim 1 wherein the ring is provided in the form of a closable loop.

5. A method of assembling a fishing lure combination comprising the steps of:
   providing a lure with a leading region, a trailing region, a longitudinal axis defined between the regions, and an aperture defined therein for attachment to a line;
   forming a raised bridge portion defined by a plurality of slits formed in the lure along sides of the raised bridge portion and located downstream from the aperture, the plurality of slits having lengths which extend parallel to the longitudinal axis of the lure, the raised bridge portion extends from the leading region so that when urged forwardly through the water, the raised bridge portion creates an area of disturbance downstream, and the raised bridge portion having first and second ends and an intermediate portion therebetween, the first and second ends being on the lure leading region and the intermediate portion spaced above the lure leading region;
   attaching a split ring to the bridge portion, the ring extending through an opening defined below the intermediate portion of the raised bridge portion and above the lure leading region;
   securing a shaft to the ring, the shaft having an eye at one end thereof, the eye extends through the ring to secure the shaft to the ring, the shaft being provided with fronds that extend from the shaft, and the fronds secured directly on the shaft.

* * * * *